United States Patent Office.

ORAZIO LUGO, OF NEW YORK, N. Y., ASSIGNOR TO THE ORALU MANUFACTURING COMPANY, OF CAMDEN, NEW JERSEY.

REFINING OILS AND REAGENT THEREFOR.

SPECIFICATION forming part of Letters Patent No. 596,410, dated December 28, 1897.

Application filed April 21, 1897. Serial No. 633,360. (No specimens.)

*To all whom it may concern:*

Be it known that I, ORAZIO LUGO, a citizen of the United States, residing at New York, in the county of New York and State of New York, have invented certain new and useful Improvements in Processes of Treating Oils, of which the following is a specification.

This invention relates to the purification of oils, and more particularly to the refining or purifying of cotton-seed oil. It embraces the production of a chemical compound or reagent for use in the purification of oils. The production of this compound is a subprocess or step in the complete process of purification and the compound itself the product of this subprocess.

The objects of the invention are to purify oils, particularly cotton-seed oil, expeditiously and economically and with a minimum shrinkage of the product.

The principal or fundamental chemical reagent employed in carrying out the invention is an aluminate of the caustic alkalies—such, for example, as aluminate of soda. This material can be effectively employed alone in the manner hereinafter pointed out; but I have found that by combining it with other chemicals the purification is rendered more effective and better results are obtained, as will be fully explained.

The aluminate, such as the aluminate of soda, acts on the impurities in the oil, rendering them insoluble, which impurities can be readily removed from the purified oil by filtration or otherwise. When, however, the aluminate is made slightly alkaline, a more complete chemical reaction takes place, and I have further discovered that the addition of a soluble fluorid, such as the fluorid of sodium, to the alkalined aluminate produces a precipitate of a much more granular nature than that produced without its presence. This granular precipitate does not clog the filter and is easily pressed into a hard cake almost free from oil and readily removed from the filtering medium. The economical advantage in this part of the process (filtering) is very great.

In carrying out the invention I proceed substantially as follows: The purifying agent preferably is produced in the following manner: Seventy-four (74) parts of aluminate of soda, twenty-two (22) parts of caustic soda, and four (4) parts of fluorid of sodium are ground and intimately mixed, preferably with about twenty (20) per cent. of water, to form a pasty and homogeneous mass. The mixture is then placed upon a flat jacketed steam vessel and heated to a temperature of about two hundred and fifty (250) degrees Fahrenheit until all the water is evaporated and a hard cake is formed. The above chemical compound efficiently purifies the oil, producing a "prime" quality with an insignificant shrinkage.

The invention should be understood as not being limited to the above proportions of the chemicals used. As already indicated, the caustic soda or the fluorid of sodium are not necessary to the purifying of the oil, for a soluble aluminate can be used as the sole reagent. The addition, however, of caustic soda and fluorid of sodium to the commercial aluminate of soda produces a better, more expeditious, and more economical operation and result. In employing this compound in the purification of cotton-seed oil it is desirable that the oil to be treated should be of a prime quality, fairly free from "foots." Take one and one-half (1½) parts, by weight, of the described compound, first having been finely ground, mixed with two (2) parts, by weight, of water. Then add it to one hundred (100) parts, by weight, of the oil to be purified. Strongly agitate the mixture of the chemical compound and the oil at the atmospheric temperature until the chemical reaction has taken place and the particles have become thoroughly incorporated. The agitation may be continued for one or more hours, according to the apparatus used and the energy of the agitation. After this the oil is heated by any convenient means, preferably with steam-coils, to about one hundred and eighty (180) degrees Fahrenheit and the heat continued for one or more hours until a complete segregation of the impurities has taken place and the oil has become free from water, clear and bright. When the oil is subsequently passed through the filtering medium, the residuum that remains can be easily removed, as it will not adhere to the filter, leaving the same in good condition for future filtrations without the necessity of cleaning it, thus rendering this otherwise difficult operation an easy and economical one. Further, the impurities extracted are of a granular nature and of a greater specific gravity than the oil. The residuum having settled leaves the supernatant oil in a condition either to be decanted from the residuum or otherwise filtered. The "foots" can be pressed to advantage in order to extract the oil contained therein.

As an example of the results obtained the following can be taken as a fair average, viz: To one hundred (100) parts, by weight, of prime crude cotton-seed oil were added one and one-half (1½) parts, by weight, of the described compound, incorporated with two (2) parts, by weight, of water. This mixture was strongly agitated for one and one-half hours at the common atmospheric temperature until the chemical reaction had taken place and a thorough mixture obtained, after which the said mixture was subjected to a heat of about 180° Fahrenheit for about one hour. (No emulsion was produced by this process.) The oil was then filtered, yielding ninety-seven and ninety-two hundredths (97.92) per cent. of pure clear prime oil, and the residuum amounted to three and fifty-eight hundredths (3.58) per cent. pressed "foots." If the oil used had been operated on or treated by other compounds—such as caustic alkalies, caustic lime, &c.—the shrinkage would have amounted to as high as fifteen per cent., as the oil was old.

I have found that when the oil is treated with a soluble fluorid in connection with the other chemical reagent rancidity of the purified oil is retarded and often prevented. The proportion of the chemical compound to the oil given above refers to a prime crude cotton-seed oil. Oils of a lower grade require a larger percentage of the chemical compound, the amount being easily determined in the laboratory. The oil after the agitation and the chemical reaction has taken place can be filtered cold.

Having thus described my invention, what I claim as new, and desire to secure by Letters Patent, is—

1. The process of purifying oils by mixing the same with a soluble aluminate, such as aluminate of soda, heating the mixture until the impurities rendered insoluble are precipitated, and finally separating the refined product from the precipitate, substantially as described.

2. The process of refining oils by mixing the same with an aluminate of a caustic alkali, such as aluminate of soda rendered slightly alkaline, heating the mixture until segregation of the impurities takes place, and separating the refined product from the precipitate, substantially as described.

3. The process of purifying oils by mixing an aluminate (such as aluminate of soda) an alkali (such as caustic soda) and a soluble fluorid (such as fluorid of sodium) adding sufficient water to make a pasty mass, and heating, then adding the compound or reagent thus formed to the oil, agitating, heating, and removing the precipitated impurities, substantially as described.

4. The described reagent for the purification of oils comprising an aluminate of a caustic alkali rendered alkaline and combined with a soluble fluorid, as set forth.

5. The process of purifying oils by mixing the same at ordinary temperature with an aluminate of a caustic alkali combined with a soluble fluorid, heating the mass, and then filtering, substantially as described.

In testimony whereof I affix my signature in presence of two witnesses.

ORAZIO LUGO.

Witnesses:
GEORGE T. HARRIS,
EDWIN W. PRESTON.